(12) United States Patent
Al-Areqi et al.

(10) Patent No.: US 11,342,862 B2
(45) Date of Patent: May 24, 2022

(54) OPERATING A MULTILEVEL CONVERTER

(71) Applicant: SIEMENS ENERGY GLOBAL GMBH & CO. KG, Munich (DE)

(72) Inventors: Sanad Al-Areqi, Erlangen (DE); Adnan Chaudhry, Erlangen (DE); Volker Hussennether, Nuremberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/416,610

(22) PCT Filed: Dec. 18, 2018

(86) PCT No.: PCT/EP2018/085524
§ 371 (c)(1),
(2) Date: Jun. 21, 2021

(87) PCT Pub. No.: WO2020/125950
PCT Pub. Date: Jun. 25, 2020

(65) Prior Publication Data
US 2022/0045625 A1    Feb. 10, 2022

(51) Int. Cl.
*H02M 7/483* (2007.01)
*H02J 3/36* (2006.01)

(52) U.S. Cl.
CPC ............. *H02M 7/4835* (2021.05); *H02J 3/36* (2013.01)

(58) Field of Classification Search
CPC .................................. H02M 7/4835; H02J 3/36
See application file for complete search history.

(56) References Cited

U.S. PATENT DOCUMENTS

| | | | |
|---|---|---|---|
| 9,590,483 B1* | 3/2017 | Basic | H02J 3/1842 |
| 9,853,574 B2* | 12/2017 | Oates | H02M 1/126 |
| 10,063,134 B2* | 8/2018 | Subramanian | H02M 7/493 |
| 10,075,056 B2* | 9/2018 | Zhang | H02M 7/487 |
| 2009/0102436 A1* | 4/2009 | Escobar Valderrama | H02J 3/1857 323/207 |
| 2016/0248341 A1* | 8/2016 | Trainer | H02M 1/08 |
| 2018/0241321 A1 | 8/2018 | Whitehouse et al. | |

(Continued)

FOREIGN PATENT DOCUMENTS

| | | |
|---|---|---|
| JP | 2017135918 A | 8/2017 |
| JP | 2017169299 A | 9/2017 |

(Continued)

*Primary Examiner* — Rafael O De Leon Domenech
(74) *Attorney, Agent, or Firm* — Laurence A. Greenberg; Werner H. Stemer; Ralph E. Locher

(57) ABSTRACT

A method of operating a multilevel converter having multiple phase modules, each with three phase module branches. In a first switching position, a switching device of each phase module connects an alternating voltage connection of the phase module to a first connection point between a first phase module branch and a third phase module branch. In a second switching position, the switching device connects the alternating voltage connection to a second connection point between the third phase module branch and a second phase module branch. In the method, circulating currents of the multilevel converter are controlled in accordance with total energy variables and differential energy variables of the phase modules to balance the energy between the phase module branches.

10 Claims, 5 Drawing Sheets

(56) References Cited

U.S. PATENT DOCUMENTS

| | | | |
|---|---|---|---|
| 2019/0199213 A1* | 6/2019 | Jaldanki | ................ H02M 7/483 |
| 2020/0119559 A1 | 4/2020 | Hong et al. | |
| 2020/0161987 A1 | 5/2020 | Gambach et al. | |

FOREIGN PATENT DOCUMENTS

| | | |
|---|---|---|
| JP | 6783419 B1 | 11/2020 |
| WO | WO2016192758 A1 | 12/2016 |
| WO | 2017029327 A1 | 2/2017 |
| WO | WO2018221906 A1 | 12/2018 |
| WO | WO2018221907 A1 | 12/2018 |
| WO | WO2019007502 A1 | 1/2019 |
| WO | WO2019007503 A1 | 1/2019 |

* cited by examiner

OPERATING A MULTILEVEL CONVERTER

BACKGROUND OF THE INVENTION

Field of the Invention

The invention relates to a method for operating a multilevel converter having multiple phase modules, which are arranged connected in parallel with one another between a first DC voltage connection and a second DC voltage connection of the multilevel converter and each have a plurality of modules each having at least two electronic switching elements and an electrical energy store. Each phase module has a first phase module branch, which is connected to the first DC voltage connection, a second phase module branch, which is connected to the second DC voltage connection, and a third phase module branch, which connects the first phase module branch to the second phase module branch. The multilevel converter also has a switching device, which in a first switching position connects an AC voltage connection of the phase module to a first connecting point between the first phase module branch and the third phase module branch and in a second switching position connects the AC voltage connection to a second connecting point between the third phase module branch and the second phase module branch.

A multilevel converter (which is also referred to as a modular multilevel converter) is a power electronics circuit for converting electrical energy. Using a multilevel converter, alternating current can be converted to direct current or direct current can be converted to alternating current, for example. A multilevel converter has a plurality of identical modules, which are electrically connected in series. The electrical series connection of the modules makes it possible to achieve high output voltages. A multilevel converter can be adapted (can be scaled) easily to different voltages and a desired output voltage can be generated relatively accurately. A multilevel converter can advantageously be used in the high-voltage range, for example as a converter in a high-voltage direct current transmission system or as a reactive power compensation system.

The number of modules in the electrical series circuit can be selected so that the multilevel converter can generate the required output voltage. Moreover, however, the number of modules in the series circuit must also be so high that the voltage applied to the modules does not exceed the maximum permissible module voltage in all operating states of the multilevel converter. Therefore, more modules have to be present in the series circuit than would actually be necessary to generate a predefined output voltage. This results in high costs, high power losses and a large structural design of the multilevel converter.

The phase modules of a conventional multilevel converter each have two phase module branches, of which one is connected to the first DC voltage connection and the other is connected to the second DC voltage connection of the multilevel converter.

The invention relates to a specific multilevel converter described at the outset, which, in contrast to a conventional multilevel converter, does not have only two phase module branches but instead has three phase module branches for each phase module. A multilevel converter of this type makes it possible to increase or to decrease the number of modules between the AC voltage connection of a phase module and the first DC voltage connection of the multilevel converter by the number of modules of the third phase module branch as required. The number of modules between the AC voltage connection of a phase module and the second DC voltage connection of the multilevel converter can also be increased or decreased by the number of modules of the third phase module branch. In other words, the modules of the third phase module branch can thus be assigned to the first phase module branch or to the second phase module branch as required.

The modules of the third phase module branch of a phase module thus have a double function. Depending on the switching position of the switching device of the phase module, these modules are connected between the AC voltage connection of the phase module and the first DC voltage connection or between the AC voltage connection and the second DC voltage connection. The modules of the third phase module branch of a phase module are thus used to generate different voltages of the phase module. Due to the possibility of switching over between the first switching position and the second switching position of the switching device of a phase module, the modules of the third phase module branch only need to be present once. In the case of a conventional multilevel converter, the additional modules must in contrast be present twice in each phase module, namely once in the first (positive-side) phase module branch and once in the second (negative-side) phase module branch of the phase module. The number of modules required per phase module can therefore be significantly reduced compared to a conventional multilevel converter due to the third phase module branch in each phase module of the specific multilevel converter. This also leads to a significant reduction in the size of the multilevel converter, the converter losses and the costs. It is possible to save 25% of the modules required.

During operation of a conventional multilevel converter with two phase module branches per phase module, energy imbalances between the energies stored in the individual phase module branches are compensated in order to load the phase module branches equally. In this case, on the one hand what is known as horizontal energy compensation is carried out between the phase modules and on the other hand what is known as vertical energy compensation is carried out between the two phase module branches of each phase module. To this end, depending on the sums of and differences between the energies of the two phase module branches of each phase module, circulating currents of the multilevel converter, which are used to transmit energy between the phase modules and between the phase module branches of the individual phase modules, are controlled.

SUMMARY OF THE INVENTION

The invention is based on the object of specifying a method for energy compensation between the phase module branches of a multilevel converter described above having three phase module branches per phase module.

The object is achieved according to the invention by way of a method having the features of claim 1 as claimed.

Advantageous configurations of the invention are the subject matter of the dependent claims.

In the method according to the invention, an energy summation variable, which is a measure of the sum of the energies of the first phase module branch and the second phase module branch, is determined for each phase module of the multilevel converter. An energy difference variable, which in the first switching position of the switching device is a measure of the difference between the energies of the second phase module branch and the third phase module branch and in the second switching position of the switching device is a measure of the difference between the energies of the first phase module branch and the third phase module branch, is also determined for each phase module depending on the switching position of the switching device of the phase module. Circulating currents of the multilevel converter are controlled depending on the energy summation variables and energy difference variables of the phase modules in order to compensate for energy imbalances between the phase module branches.

The invention thus makes provision for circulating currents of the multilevel converter to be controlled depending on sums of the energies of the first phase module branch and of the second phase module branch of each phase module and on differences between the energies of the first or second phase module branch and of the third phase module branch of each phase module in order to compensate for energy imbalances. In this case, it depends on the switching position of the switching device of a phase module as to whether the difference between the energies of the first and the third phase module branch or the difference between the energies of the second and the third phase module branch is used. The invention makes it possible to transfer the principle of energy compensation between the phase module branches used for conventional multilevel converters to the specific multilevel converter with three phase module branches per phase module by virtue of circulating currents of the multilevel converter being controlled for energy compensation as in a conventional multilevel converter. In this case, to control the circulating currents, the same number of sums of and differences between energies of the phase module branches as in a conventional multilevel converter with the same number of phase modules is used even though the specific multilevel converter has a greater number of phase module branches per phase module than a conventional multilevel converter. For example, in a three-phase specific multilevel converter, three energy summation variables and three energy difference variables are formed from the energies of the overall nine phase module branches and therefore just as many as in the case of a conventional three-phase multilevel converter with two phase module branches per phase module. As a result, the same circulating current controller can be used for energy compensation for the specific multilevel converter with three phase module branches per phase module as is used for conventional multilevel converters.

One configuration of the invention makes provision for an energy summation space vector to be formed from the energy summation variables of all phase modules and for a DC component of the circulating currents to be controlled depending on the energy summation space vector in order to compensate for energy imbalances between the phase modules. This configuration of the invention makes use of the fact that the DC component of the circulating currents makes direct energy transmission between phase modules possible and therefore can be used for horizontal energy compensation and that the DC component depends on the energy summation space vector.

A further configuration of the invention makes provision for an energy difference space vector to be formed from the energy difference variables of all phase modules and for a positive phase-sequence system and a negative phase-sequence system of the circulating currents to be controlled depending on the energy difference space vector in order to compensate for energy imbalances between the phase module branches of the individual phase modules. This configuration of the invention makes use of the fact that a vertical energy compensation between the phase module branches of the individual phase modules can be achieved owing to the control of the positive phase-sequence system and the negative phase-sequence system of the circulating currents and that the positive phase-sequence system and the negative phase-sequence system of the circulating currents depend on the energy difference space vector.

Further configurations of the invention make provision for the energy summation variable of each phase module to be determined from voltages applied respectively to the first phase module branch and to the second phase module branch of the phase module and/or for the energy difference variable of each phase module to be determined in the first switching position of the switching device of the phase module from voltages applied respectively to the second phase module branch and to the third phase module branch of the phase module and in the second switching position of the switching device of the phase module from voltages applied respectively to the first phase module branch and to the third phase module branch of the phase module. These configurations of the invention make use of the fact that the energy of a phase module branch depends on the voltage applied to the phase module branch.

The multilevel converter can be configured in such a way that the switching device of a phase module in the second switching position (electrically) disconnects the AC voltage connection of the phase module from the first connecting point and in the first switching position (electrically) disconnects the AC voltage connection from the second connecting point. Generally speaking, the switching device connects the AC voltage connection in each switching position only at most to one connecting point (associated with the switching position) in each case (and disconnects the AC voltage connection from the respective other connecting points). The switching device thus connects (in the switching positions thereof) the AC voltage connection in each case exclusively to one connecting point (associated with the switching position). Of course, there may also be a switching position in which the AC voltage connection is disconnected from all connecting points.

The multilevel converter can also be configured in such a way that the first phase module branch, the second phase module branch and the third phase module branch each have at least two of the modules, in particular in each case at least five of the modules, in a series circuit.

The multilevel converter can also be configured in such a way that the switching device has thyristors (as switching elements). The changeover between the first connecting point and the second connecting point can be carried out particularly quickly by means of thyristors.

The multilevel converter can also be configured in such a way that
 the switching device of each phase module has a first power electronics switch, which in the first switching position of the switching device (electrically) connects the AC voltage connection to the first connecting point and in the second switching position of the switching device (electrically) disconnects the AC voltage connection from the first connecting point and
 the switching device of each phase module has a second power electronics switch, which in the second switching position of the switching device (electrically) connects the AC voltage connection to the second connecting point and in the first switching position of the switching device (electrically) disconnects the AC voltage connection from the second connecting point. The changeover between the first connecting point and the second connecting point can be carried out particularly simply and quickly using the two power electronics switches of a switching device.

The multilevel converter can be configured in such a way that the first power electronics switch and the second power electronics switch of each switching device each have thyristors.

The multilevel converter can also be configured in such a way that the first power electronics switch and the second power electronics switch of each switching device each have thyristors connected in antiparallel. As a result, the power electronics switches can switch the alternating current with both polarities flowing through the AC voltage connection of the phase module.

The multilevel converter can be configured in such a way that at least one module of the third phase module branch is configured in such a way that it is capable of outputting a voltage with a positive or negative polarity. This advantageously supports, in particular, the switch-off process of the thyristors. In this case, it is particularly advantageous that the at least one module is able to generate and output both a negative voltage and a positive voltage. The commutation of the current flowing via the AC voltage connection from the first connecting point to the second connecting point can be realized safely and reliably by means of said voltage. This can take place, for example, by virtue of a voltage in the opposite direction to the original flow of current being generated as commutation voltage by means of the module.

The multilevel converter can be configured in such a way that at least one module of the third phase module branch has a full-bridge circuit. In this case, it is particularly advantageous that the at least one module with a full-bridge circuit is able to generate and output both a negative voltage and a positive voltage. This supports the commutation, as is detailed above.

The multilevel converter can be configured in such a way that the full-bridge circuit has four electronic switching elements and an electrical energy store.

The multilevel converter can also be configured in such a way that the switching device of each phase module assumes its switching positions, in particular the first switching position and the second switching position, depending on the instantaneous value of the voltage (AC voltage) applied to the AC voltage connection of the phase module. The switching device can advantageously be actuated in such a way that it assumes the switching positions depending on the instantaneous value of the voltage (AC voltage) applied to the AC voltage connection. This results in a particularly simple type of actuation of the switching device. Only the instantaneous value of the AC voltage needs to be evaluated and, depending on the magnitude of the instantaneous value, the switching device assumes the respective switching position (in particular the first switching position and the second switching position).

The multilevel converter can also be configured in such a way that
- the switching device of each phase module assumes the first switching position when the instantaneous value of the voltage applied to the AC voltage connection of the phase module is greater than (or equal to) zero and the switching device assumes the second switching position when the instantaneous value of the voltage applied to the AC voltage connection is smaller than zero, or
- the switching device of each phase module assumes the first switching position when the instantaneous value of the voltage applied to the AC voltage connection of the phase module lies within a first preselected voltage range and the switching device assumes the second switching position when the instantaneous value of the voltage applied to the AC voltage connection lies within a second preselected voltage range. The first alternative advantageously forms a particularly simple option of stipulating when the switching device assumes the first switching position and when it assumes the second switching position: when the instantaneous value of the AC voltage is greater than (or equal to) zero, the first switching position is assumed; when the instantaneous value of the AC voltage is smaller than zero, the second switching position is assumed. The second alternative specifies that the first switching position is assumed when the instantaneous value of the AC voltage lies within a first preselected voltage range. When the instantaneous value lies within a second preselected voltage range, the second switching position is then assumed. This variant makes it possible to switch the switching device in an even more flexible manner.

The above-described properties, features and advantages of this invention and the manner in which they are achieved become clearer and more distinctly comprehensible in connection with the following description of exemplary embodiments, which are explained in more detail in connection with the drawings, in which:

Parts that correspond to one another are provided with the same reference signs in the figures.

DETAILED DESCRIPTION OF THE INVENTION

Figure 1:
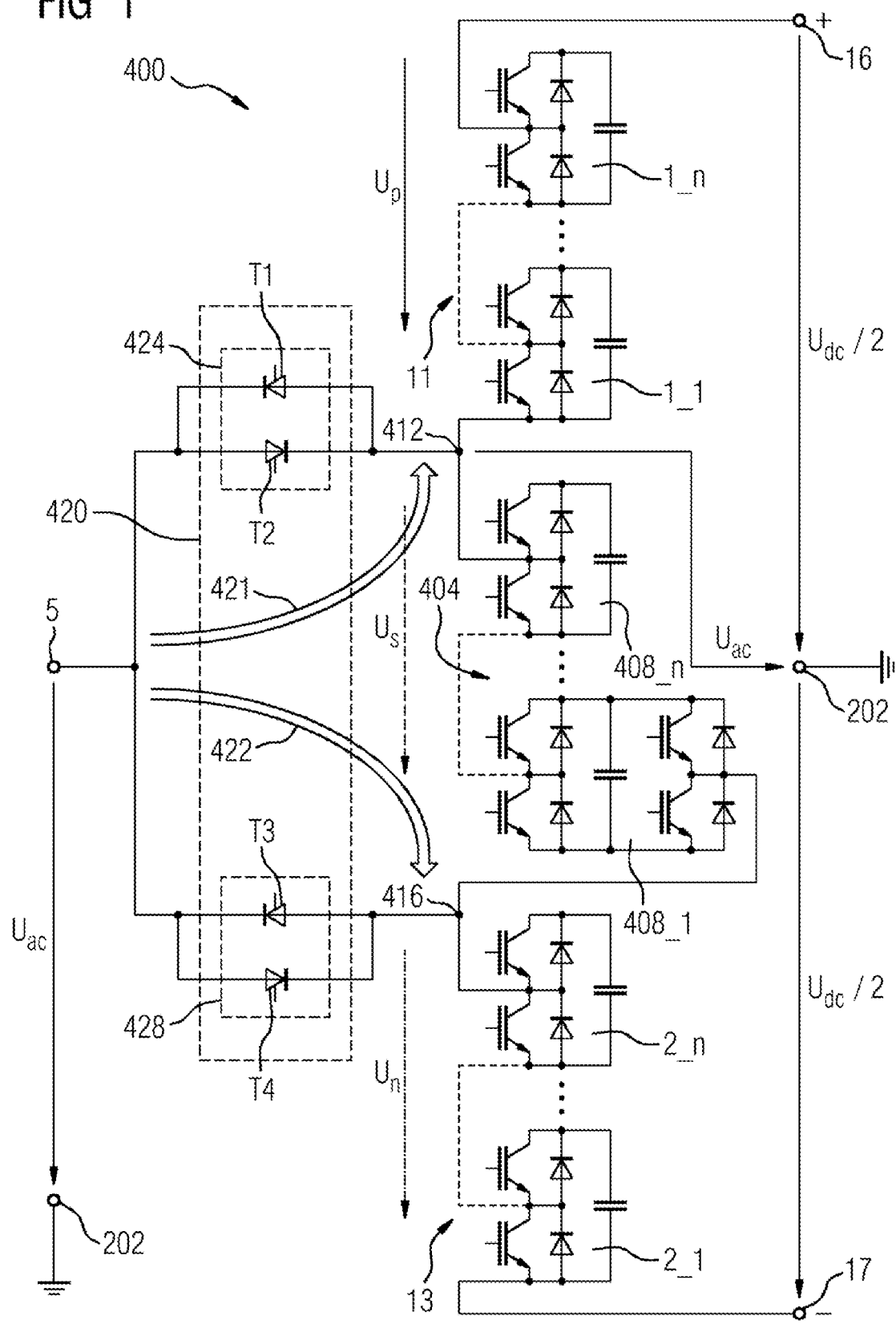
FIG. 1 shows an exemplary embodiment of a phase module of a multilevel converter.

FIG. 1 illustrates an exemplary embodiment of a phase module 400 of a multilevel converter 800. The phase module 400 has a first (positive-side) phase module branch 11, a second (negative-side) phase module branch 13 and a third (central) phase module branch 404. A first voltage $U_p$ is applied via the first phase module branch 11, a second voltage $U_n$ is applied via the second phase module branch 13 and a third voltage $U_s$ is applied via the third phase module branch 404. The phase module 400 is arranged between a first DC voltage connection 16 and a second DC voltage connection 17, wherein the first phase module branch 11 is connected to the first DC voltage connection 16. The second phase module branch 13 is connected to the second DC voltage connection 17. Each phase module branch has a plurality of modules. In the exemplary embodiment, the first phase module branch 11 has n modules 1_1 ... 1_n, which can each be configured in a half-bridge circuit (half-bridge modules) or in a full-bridge circuit (full-bridge modules). The second phase module branch 13 likewise has n modules 2_1 ... 2_n, which can each be configured in a half-bridge circuit (half-bridge modules) or in a full-bridge circuit (full-bridge modules). The first phase module branch 11 and the second phase module branch 13 can thus also have in each case only half-bridge modules or in each case only full-bridge modules, for example.

The third phase module branch 404 has at least one module 408_1 with a full-bridge circuit (full-bridge module 408_1) and also further modules 408_2 to 408_n, which can each be configured in a half-bridge circuit (half-bridge modules) or in a full-bridge circuit (full-bridge modules).

The third phase module branch 404 connects the first phase module branch 11 to the second phase module branch 13 so as to form a first connecting point 412 between the first phase module branch 11 and the third phase module branch 404 and so as to form a second connecting point 416 between the third phase module branch 404 and the second phase module branch 13. A switching device 420 is set up in a first switching position 421 to electrically connect an AC voltage connection 5 of the phase module 400 to the first connecting point 412 and in a second switching position 422 to electrically connect the AC voltage connection 5 to the second connecting point 416. The switching device 420 is furthermore set up in the second switching position 422 to electrically disconnect the AC voltage connection 5 from the first connecting point 412 and in the first switching position 421 to electrically disconnect the AC voltage connection 5 from the second connecting point 416.

The switching device 420 has a first thyristor T1, a second thyristor T2, a third thyristor T3 and a fourth thyristor T4 as switching elements. More precisely, the switching device has a first power electronics switch 424 and a second power electronics switch 428. The first power electronics switch 424 in this case has the first thyristor T1 and the second thyristor T2; the second power electronics switch 428 in this case has the third thyristor T3 and the fourth thyristor T4. The first power electronics switch 424 thus has thyristors T1 and T2 connected in antiparallel; the second power electronics switch 428 has thyristors T3 and T4 connected in antiparallel.

The illustration with individual thyristors T1, T2, T3 and T4 is to be understood here purely symbolically. In reality, for example, a greater number of thyristors can be connected in series and/or in parallel in order to realize the voltage and current values required.

The first power electronics switch 424 in the first switching position of the switching device 420 electrically connects the AC voltage connection 5 to the first connecting point 412; the first power electronics switch 424 in the second switching position of the switching device 420 electrically disconnects the AC voltage connection 5 from the first connecting point 412. The second power electronics switch 428 in the second switching position of the switching device 420 electrically connects the AC voltage connection 5 to the second connecting point 416; the second power electronics switch 428 in the first switching position of the switching device 420 electrically disconnects the AC voltage connection 5 from the second connecting point 416.

An AC voltage $U_{ac}$ is applied between the AC voltage connection 5 and a ground connection 202. The voltage ½ $U_{dc}$ is applied between the first DC voltage connection 16 and the ground connection 202, wherein $U_{dc}$ is the total DC voltage applied between the first DC voltage connection 16 and the second DC voltage connection 17. The voltage ½ $U_{dc}$ is also applied between the ground connection 202 and the second DC voltage connection 17.

The switching device 420 assumes its switching positions (that is to say the first switching position and the second switching position) depending on the instantaneous value of the AC voltage $U_{ac}$ applied to the AC voltage connection 5. More precisely, the switching device 420 is actuated by an actuation device (not illustrated) in such a way that it assumes its switching positions (that is to say the first switching position and the second switching position) depending on the instantaneous value of the AC voltage $U_{ac}$ applied to the AC voltage connection 5. In this case, the switching device 420 then assumes the first switching position when the instantaneous value of the AC voltage $U_{ac}$ is greater than (or equal to) zero. The first AC voltage connection 5 is then electrically connected to the first connecting point 412. The switching device 420 assumes the second switching position when the instantaneous value of the AC voltage $U_{ac}$ applied to the AC voltage connection 5 is smaller than zero. The first AC voltage connection 5 is then electrically connected to the second connecting point 416.

The multilevel converter 800 can also be set up in such a way that the switching device 420 assumes the first switching position when the instantaneous value of the AC voltage $U_{ac}$ applied to the AC voltage connection 5 lies within a first preselected voltage range and the switching device 420 assumes the second switching position when the instantaneous value of the AC voltage $U_{ac}$ applied to the AC voltage connection lies within a second preselected voltage range. The first preselected voltage range can be, for example, the voltage range between 0 and +½ $U_{dc}$; the second preselected voltage range can be, for example, the voltage range between -½ $U_{dc}$ and 0.

Figure 2:
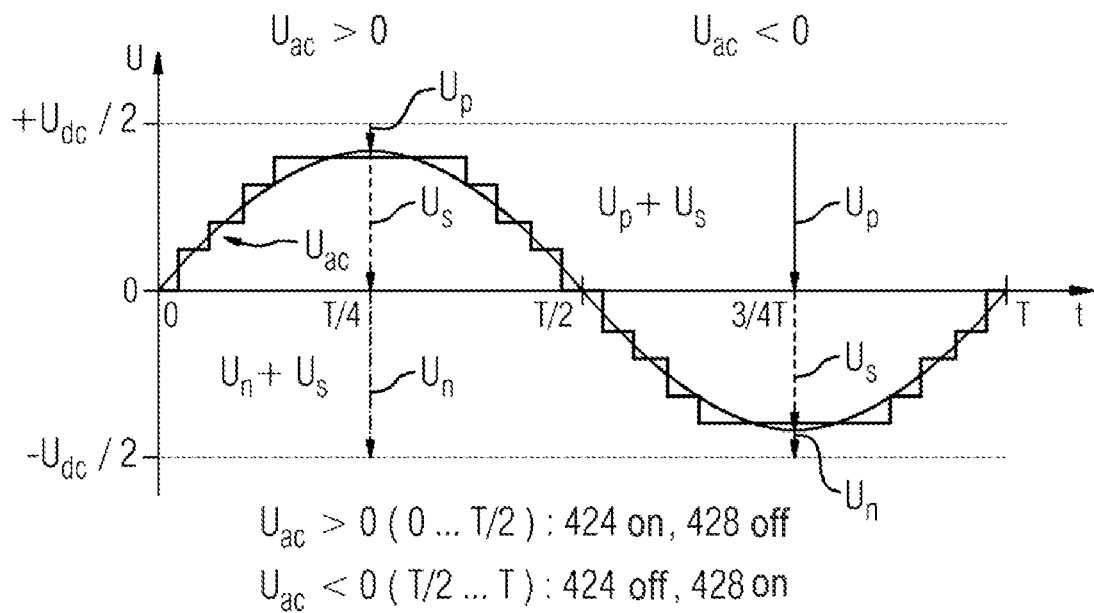
FIG. 2 shows an exemplary voltage profile at the phase module according to FIG. 1.

FIG. 2 illustrates by way of example voltages that are produced in the phase module 400. During the time interval between t=0 and t=½ T (that is to say during the period in which the instantaneous values of the AC voltage $U_{ac}$ are greater than zero), only the relatively low voltage $U_p$ is applied to the first phase module branch 11. The greater voltage ($U_{dc}-U_p$) is distributed to the second phase module branch 13 (as voltage $U_n$) and to the third phase module branch 404 (as voltage $U_s$). As a result, in each case at a maximum the voltage ½ $U_{dc}$ is applied to the first phase module branch 11, to the second phase module branch 13 and to the third phase module branch 404. That is to say, each phase module branch 11, 13 and 404 in each case needs to be configured only for half the maximum DC voltage ½ $U_{dc}$. During the second half period (that is to say in the range between t=½ T and t=T), only the relatively low voltage $U_n$ is applied to the second phase module branch 13, whereas the greater voltage ($U_{dc}-U_n$) is distributed to the first phase module branch 11 and the second phase module branch 404. In a manner analogous to the processes in the first half of the period of the AC voltage $U_{ac}$, at a maximum the voltage ½ $U_{dc}$ arises again at each phase module branch 11, 13, 404.

Figure 3:
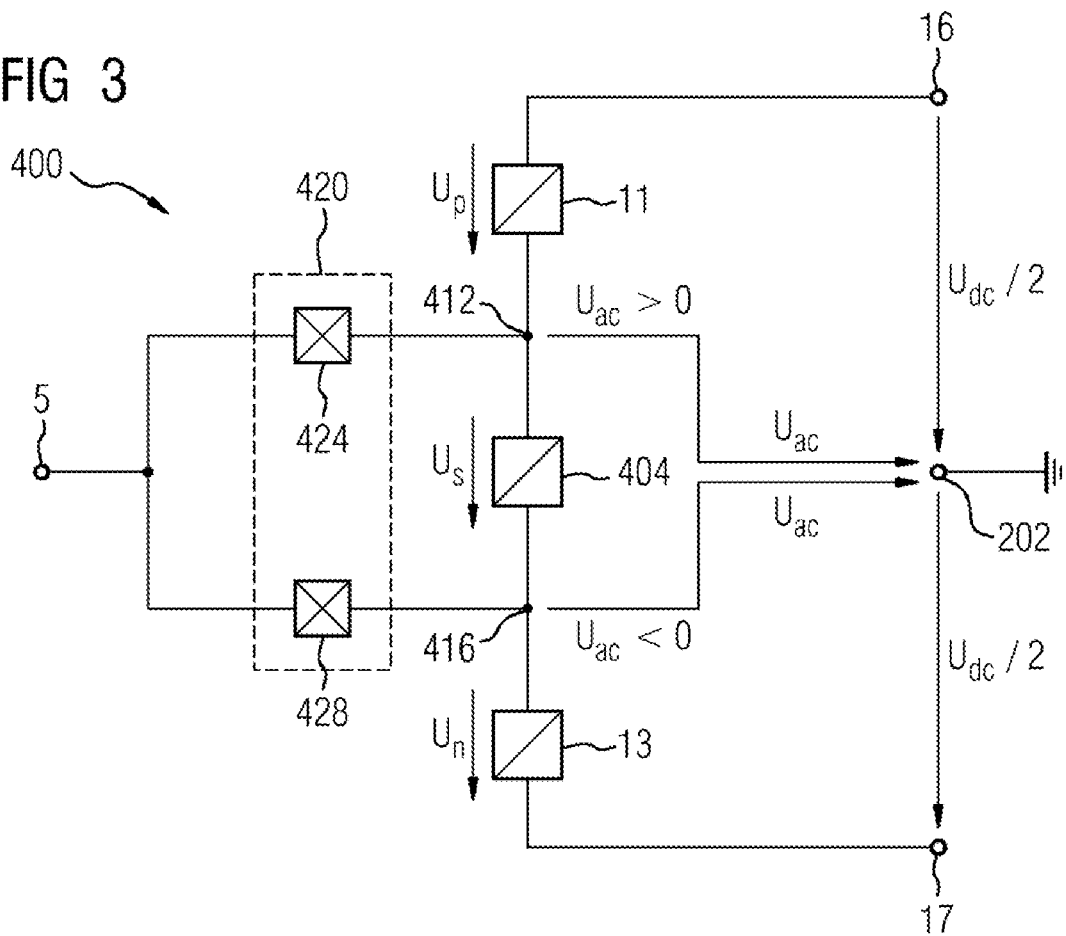
FIG. 3 shows an alternative illustration of the phase module according to FIG. 1.

FIG. 3 illustrates the phase module 400 of FIG. 1 once again in a simplified illustration. The first phase module branch 11, the second phase module branch 13 and the third phase module branch 404 are also each illustrated symbolically as a square with a diagonal line drawn through them. The first power electronics switch 424 and the second power electronics switch 428 are each illustrated as a smaller square with two diagonal lines drawn through them. FIG. 3 furthermore illustrates by means of voltage arrows how the AC voltage $U_{ac}$ arising at the AC voltage connection 5 with respect to the ground connection 202 during the first half period of the AC voltage ($U_{ac}$>0) arises between the first connecting point 412 and the ground connection 202. During the second half period ($U_{ac}$<0), the AC voltage $U_{ac}$ arises between the second connecting point 416 and the ground connection 202 (this illustration requires that the first power electronics switch 424 and the second power electronics switch 428 behave as ideal switches, that is to say no voltage is dropped across these switches 424 and 428 in the switched-on state).

The AC voltage connection 5 is electrically connected to the first connecting point 412 and electrically disconnected from the second connecting point 416 when the instantaneous value of the AC voltage $U_{ac}$ applied to the AC voltage connection 5 is greater than (or equal to) zero. The AC voltage connection 5 is electrically connected to the second connecting point 416 and electrically disconnected from the first connecting point 412 when the instantaneous value of the AC voltage $U_{ac}$ applied to the AC voltage connection 5 is smaller than zero.

Figure 4:
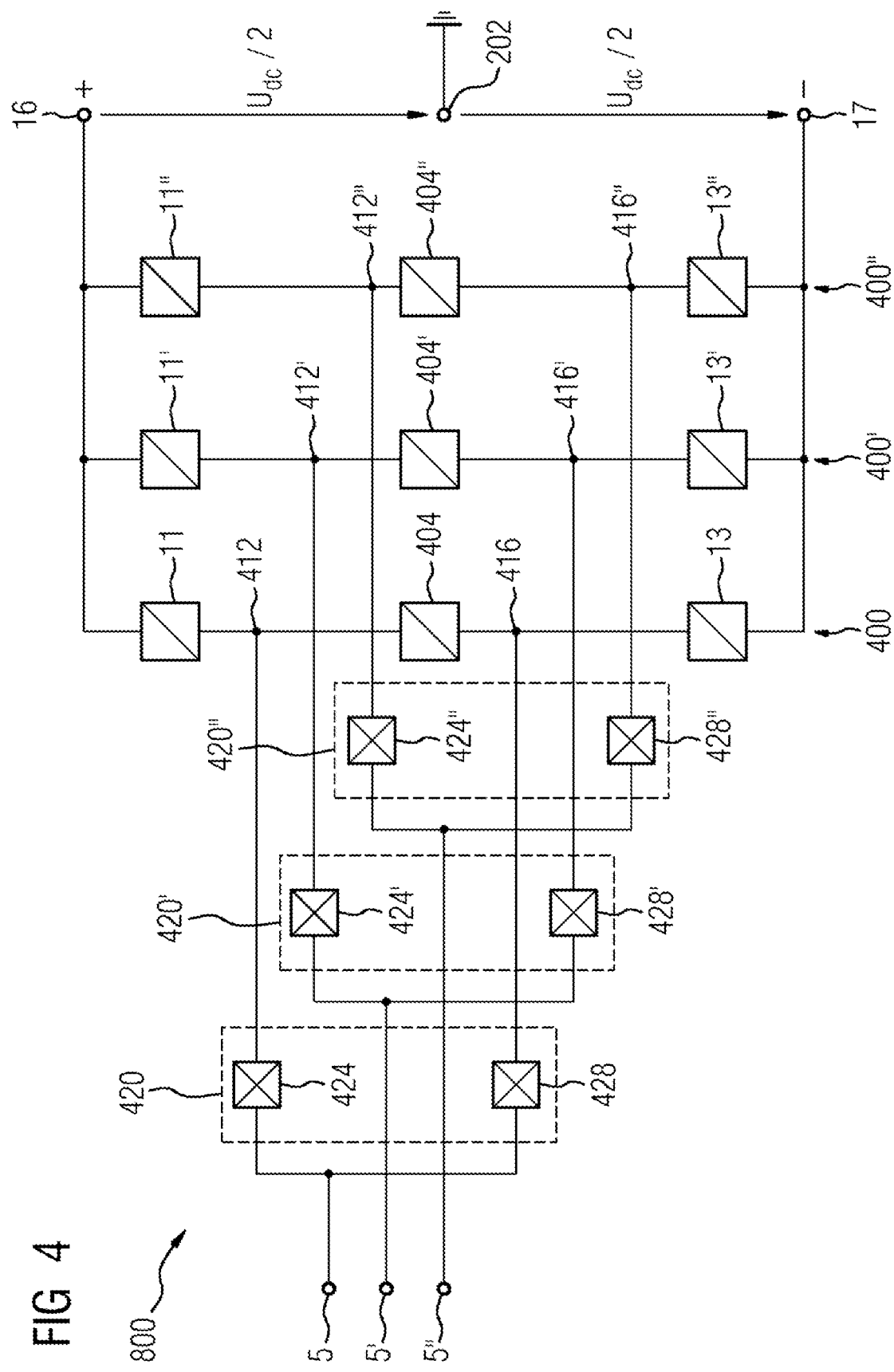
FIG. 4 shows an exemplary embodiment of a multilevel converter with three phase modules.

FIG. 4 illustrates an exemplary embodiment of a three-phase multilevel converter 800. The multilevel converter 800 has three phase modules 400, 400', 400" according to FIG. 3. A first phase module 400 has the phase module branches 11, 13, 404, the switching device 420 with the power electronics switches 424, 428, the connecting points 412, 416 and the AC voltage connection 5. A second phase module 400' has the phase module branches 11', 13', 404', the switching device 420' with the power electronics switches 424', 428', the connecting points 412', 416' and the AC voltage connection 5'. The third phase module 400" has the phase module branches 11", 13", 404", the switching device 420" with the power electronics switches 424", 428", the connecting points 412", 416" and the AC voltage connection 5".

For the operation of the multilevel converter 800, the instantaneous value of each voltage applied to an AC voltage connection 5, 5', 5" of the multilevel converter 800 is measured. Depending on the measured instantaneous value, the AC voltage connection 5, 5', 5" is electrically connected to the respective first connecting point 412, 412', 412" or the respective second connecting point 416, 416', 416". In this case, each AC voltage connection 5, 5', 5" is in each case electrically connected to just one of the connecting points 412, 412', 412", 416, 416', 416" and electrically disconnected from the other connecting points 412, 412', 412", 416, 416', 416".

Figure 5:
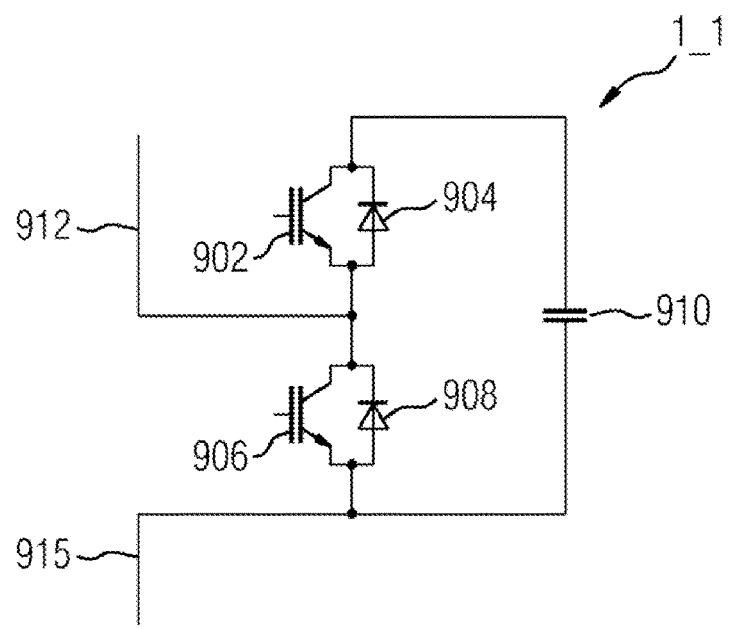
FIG. 5 shows an exemplary embodiment of a module of a multilevel converter.

FIG. 5 illustrates an exemplary embodiment of a module 1_1 of the multilevel converter 800.

The module 1_1 is configured as a half-bridge module. The module 1_1 has a first (switch-off) electronic switching element 902 (first switch-off semiconductor valve 902) with a first diode 904 connected in antiparallel.

The module 1_1 also has a second (switch-off) electronic switching element 906 (second switch-off semiconductor valve 906) with a second diode 908 connected in antiparallel and an electrical energy store 910 in the form of a capacitor. The first electronic switching element 902 and the second electronic switching element 906 are each configured as an IGBT (insulated-gate bipolar transistor). The first electronic switching element 902 is electrically connected in series with the second electronic switching element 906. A first galvanic module connection 912 is arranged at the connecting point between the two electronic switching elements 902 and 906. A second galvanic module connection 915 is arranged at the connection of the second electronic switching element 906 located opposite the connecting point. The second module connection 915 is also electrically connected to a first connection of the energy store 910; a second connection of the energy store 910 is electrically connected to the connection of the first electronic switching element 902 located opposite the connecting point.

The energy store 910 is thus electrically connected in parallel with the series circuit composed of the first electronic switching element 902 and the second electronic switching element 906. Appropriate actuation of the first electronic switching element 902 and the second electronic switching element 906 by an electronic control device (not illustrated) of the converter 800 can lead to either the voltage of the energy store 910 being output between the first module connection 912 and the second module connection 915 or no voltage being output (that is to say a zero voltage is output). The respectively desired output voltage of the converter can thus be generated through interaction of the modules of the individual phase module branches.

Figure 6:
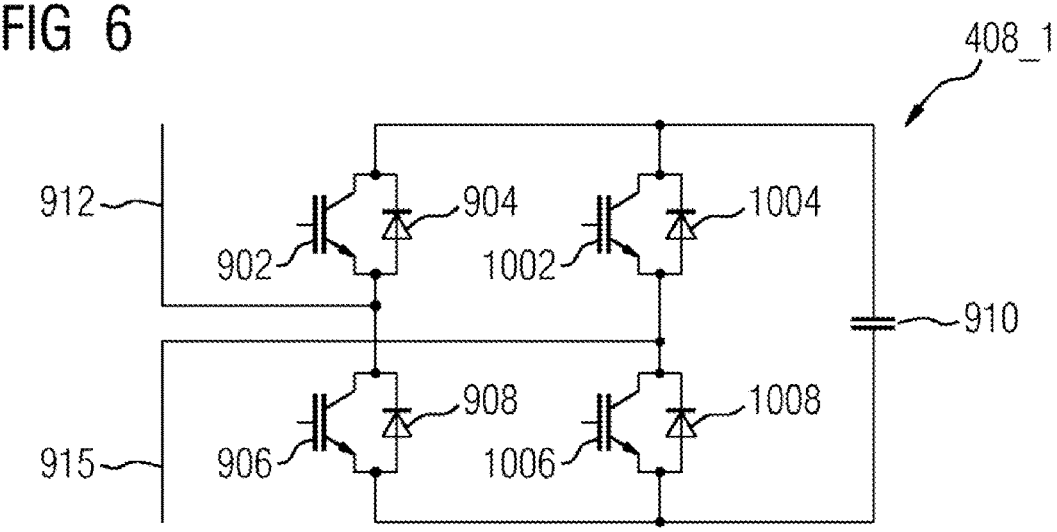
FIG. 6 shows a further exemplary embodiment of a module of a multilevel converter.

FIG. 6 illustrates a further exemplary embodiment of a module 408_1 of the multilevel converter 800. In addition to the first electronic switching element 902, the second electronic switching element 906, the first freewheeling diode 904, the second freewheeling diode 908 and the energy store 910, which are already known from FIG. 5, the module 408_1 illustrated in FIG. 6 has a third electronic switching element 1002 with a third freewheeling diode 1004 connected in antiparallel and also a fourth electronic switching element 1006 with a fourth freewheeling diode 1008 connected in antiparallel. The third electronic switching element 1002 and the fourth electronic switching element 1006 are each configured as an IGBT. In contrast to the circuit of FIG. 5, the second module connection 915 is not electrically connected to the second electronic switching element 906 but instead to a central point of an electrical series circuit composed of the third electronic switching element 1002 and the fourth electronic switching element 1006.

The module 408_1 of FIG. 6 is what is known as a full-bridge module, in which, upon appropriate actuation of the four electronic switching elements 902, 906, 1002, 1006, either the positive voltage of the energy store 910, the negative voltage of the energy store 910 or a voltage of the value zero (zero voltage) can be output selectively between the first (galvanic) module connection 912 and the second (galvanic) module connection 915. That is to say the polarity of the output voltage can therefore be reversed by means of the module 408_1. The multilevel converter 800 can have either only half-bridge modules, only full-bridge modules or else half-bridge modules and full-bridge modules.

Figure 7:
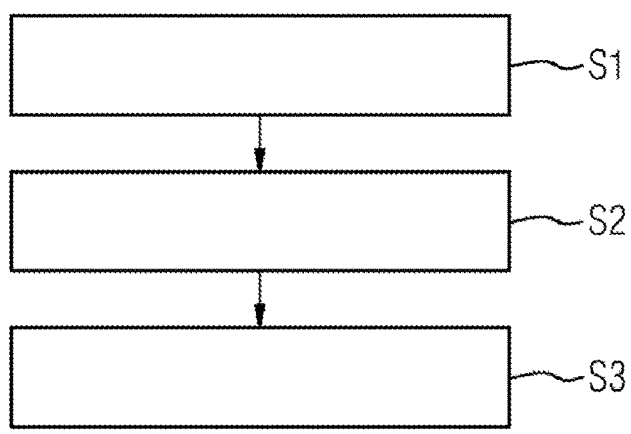
FIG. 7 shows a flowchart of an exemplary embodiment of the method according to the invention.

FIG. 7 shows a flowchart of an exemplary embodiment of the method according to the invention with method steps S1 to S3 for operating a multilevel converter 800 according to FIG. 4.

In a first method step S1, an energy summation variable $W_{\Sigma 1}$, $W_{\Sigma 2}$, $W_{\Sigma 3}$, which is a measure of the sum of the energies of the first phase module branch 11, 11', 11" and the second phase module branch 13, 13', 13", is determined for each phase module 400, 400', 400". In this case, $W_{\Sigma 1}$ denotes the energy summation variable that is a measure of the sum of the energies of the first phase module branch 11 and the second phase module branch 13 of the first phase module 400, $W_{\Sigma 2}$ denotes the energy summation variable that is a measure of the sum of the energies of the first phase module branch 11' and the second phase module branch 13' of the second phase module 400' and $W_{\Sigma 3}$ denotes the energy summation variable that is a measure of the sum of the energies of the first phase module branch 11" and the second phase module branch 13" of the third phase module 400".

For example, the energy summation variable $W_{\Sigma 1}$, $W_{\Sigma 2}$, $W_{\Sigma 3}$ of each phase module 400, 400', 400" is determined from the voltage $U_p$ applied to the first phase module branch 11, 11', 11" and from the voltage $U_n$ applied to the second phase module branch 13, 13', 13".

Furthermore, in the first method step S1, an energy difference variable $W_{\Delta 1}$, $W_{\Delta 2}$, $W_{\Delta 3}$, which in the first switching position 421 is a measure of the difference between the energies of the second phase module branch 13, 13', 13" and the third phase module branch 404, 404', 404" and in the second switching position 422 is a measure of the difference between the energies of the first phase module branch 11, 11', 11" and the third phase module branch 404, 404', 404", is determined for each phase module 400, 400', 400" depending on the switching position of the switching device 420, 420', 420" of the phase module 400, 400', 400". In this case, $W_{\Delta 1}$ denotes the energy difference variable of the first phase module 400, $W_{\Delta 2}$ denotes the energy difference variable of the second phase module 400' and $W_{\Delta 3}$ denotes the energy difference variable of the third phase module 400". For example, the energy difference variable $W_{\Delta i}$, $W_{\Delta 2}$, $W_{\Delta 3}$ of each phase module 404, 404', 404" in the first switching position 421 of the switching device 420, 420', 420" of the phase module 400, 400', 400" is determined from the voltage $U_n$ applied to the second phase module branch 13, 13', 13" and from the voltage $U_s$ applied to the third phase module branch 404, 404', 404" and in the second switching position 422 of the switching device 420, 420', 420" of the phase module 400, 400', 400" from the voltage $U_p$ applied to the first phase module branch 11, 11', 11" and the voltage $U_s$ applied to the third phase module branch 404, 404', 404".

In a second method step S2, an energy summation space vector is formed from the energy summation variables $W_{\Sigma 1}$, $W_{\Sigma 2}$, $W_{\Sigma 3}$ of all phase modules 400, 400', 400". Furthermore, in the second method step S2, an energy difference space vector is formed from the energy difference variables $W_{\Delta 1}$, $W_{\Delta 2}$, $W_{\Delta 3}$ of all phase modules 400, 400', 400".

In a third method step S3, a DC component of circulating currents of the multilevel converter 800 is controlled depending on the energy summation space vector in order to compensate for energy imbalances between the phase modules 400, 400', 400". Furthermore, in the third method step S3, a positive phase-sequence system and a negative phase-sequence system of the circulating currents are controlled depending on the energy difference space vector in order to compensate for energy imbalances between the phase module branches 11, 11', 11", 13, 13', 13", 404, 404', 404" of the individual phase modules 400, 400', 400". For this purpose, a setpoint current space vector for the circulating currents is determined from the energy summation space vector and the energy difference space vector in a manner described in more detail below and this is used to control the circulating currents.

Figure 8:
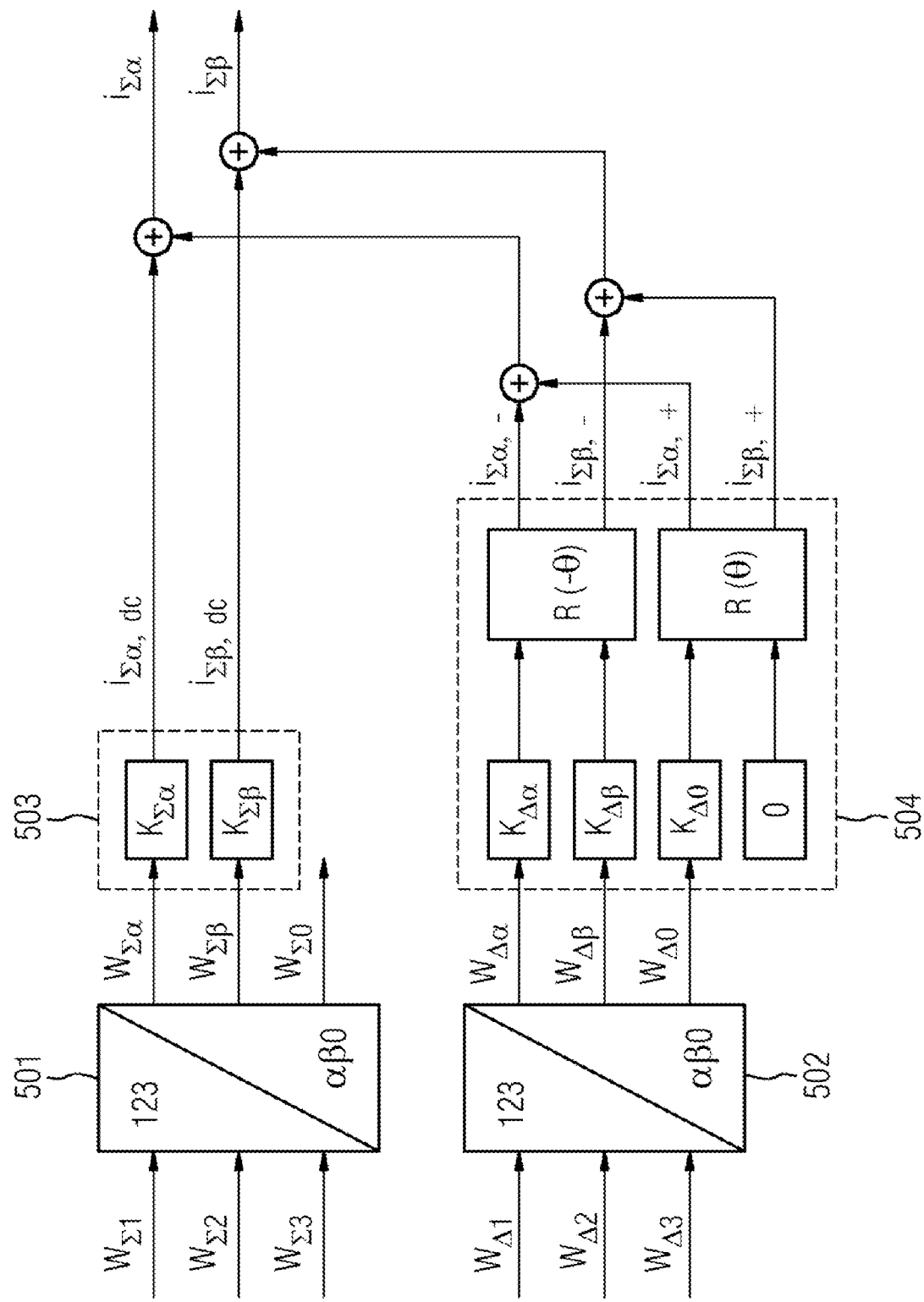
FIG. 8 shows a block diagram for determining a setpoint current space vector for controlling circulating currents of a multilevel converter.

FIG. 8 shows a block diagram of determining the setpoint current space vector for the control of the circulating currents for energy compensation between the phase module branches 11, 11', 11", 13, 13', 13", 404, 404', 404" of the multilevel converter 800.

An energy summation space vector with components $W_{\Sigma\alpha}$, $W_{\Sigma\beta}$, $W_{\Sigma 0}$ is formed from the energy summation variables $W_{\Sigma 1}$, $W_{\Sigma 2}$, $W_{\Sigma 3}$ by a first transformer 501. A DC component $i_{\Sigma\alpha,dc}$ of an α-component $i_{\Sigma\alpha}$ of the setpoint current space vector is formed from the α-component $W_{\Sigma\alpha}$ of the energy summation space vector by a first setpoint value former 503. Furthermore, a DC component $i_{\Sigma\beta,dc}$ of a β-component $i_{\Sigma\beta}$ of the setpoint current space vector is formed from the β-component $W_{\Sigma\beta}$ of the energy summation space vector by the first setpoint value former 503.

An energy difference space vector with components $W_{\Delta\alpha}$, $W_{\Delta\beta}$, $W_{\Delta 0}$ is formed from the energy difference variables $W_{\Delta 1}$, $W_{\Delta 2}$, $W_{\Delta 3}$ by a second transformer 502. A negative phase-sequence system component $i_{\Sigma\alpha,-}$ of an α-component $i_{\Sigma\alpha}$ of the setpoint current space vector and a negative phase-sequence system component $i_{\Sigma\beta,-}$ of a β-component $i_{\Sigma\beta}$ of the setpoint current space vector are formed from the α-component $W_{\Delta\alpha}$ and the β-component $W_{\Delta\beta}$ of the energy difference space vector by a second setpoint value former 504. Furthermore, a positive phase-sequence system component $i_{\Sigma\alpha,+}$ of an α-component $i_{\Sigma\alpha}$ of the setpoint current space vector and a positive phase-sequence system component $i_{\Sigma\beta,+}$ of a β-component $i_{\Sigma\beta}$ of the setpoint current space vector are formed from the 0-component $W_{\Delta 0}$ of the energy difference space vector by the second setpoint value former 504. In order to form the negative phase-sequence system components $i_{\Sigma\alpha,-}$ and $i_{\Sigma\beta,-}$ and the positive phase-sequence system components $i_{\Sigma\alpha,+}$ and $i_{\Sigma\beta,+}$, the current components are transformed into a coordinate system that rotates at a grid frequency of the multilevel converter 800 and split into their negative and positive phase-sequence system. To this end, rotation matrices $$R(-\theta) = \begin{pmatrix} \cos(\theta) & \sin(\theta) \\ -\sin(\theta) & \cos(\theta) \end{pmatrix}, R(\theta) = \begin{pmatrix} \cos(\theta) & -\sin(\theta) \\ \sin(\theta) & \cos(\theta) \end{pmatrix}$$

are used, using which the respective current components are transformed to the negative and positive phase-sequence system, respectively, at an angle of rotation $-\theta$ and $\theta$, respectively.

The α-component $i_{\Sigma\alpha}$ of the setpoint current space vector is formed by addition from the DC component $i_{\Sigma\alpha,dc}$, the negative phase-sequence system component $i_{\Sigma\alpha,-}$ and the positive phase-sequence system component $i_{\Sigma\alpha,+}$ thereof. The β-component $i_{\Sigma\beta}$ of the setpoint current space vector is formed by addition from the DC component $i_{\Sigma\beta,dc}$, the negative phase-sequence system component $i_{\Sigma\beta,-}$ and the positive phase-sequence system component $i_{\Sigma\beta,+}$ thereof.

Although the invention has been illustrated and described in more detail by way of preferred exemplary embodiments, the invention is not restricted by the disclosed examples and other variations can be derived herefrom by a person skilled in the art without departing from the scope of protection of the invention.

LIST OF REFERENCE SIGNS

1_1 ... 1_n module of a first phase module branch
2_1 ... 2_n module of a second phase module branch
5, 5', 5" AC voltage connection
11, 11', 11" first phase module branch
13, 13', 13" second phase module branch
16, 17 DC voltage connection
202 ground connection
400, 400', 400" phase module
404, 404', 404" third phase module branch
408_1 ... 408_n module of a third phase module branch
412, 412', 412" first connecting point
416, 416', 416" second connecting point
420, 420', 420" switching device
424, 424', 424" first power electronics switch
428, 428', 428" second power electronics switch
421, 422 switching position 501, 502 transformer
503, 504 setpoint value former
800 multilevel converter
902, 906, electronic switching element
1002, 1006 electronic switching element
904, 908, diode
1004, 1008 diode
910 energy store
912, 915 module connection
$i_{\Sigma\alpha}$, $i_{\Sigma\beta}$ component of a setpoint current space vector
$i_{\Sigma\alpha,dc}$, $i_{\Sigma\beta,dc}$ DC component of a component of a setpoint current space vector
$i_{\Sigma\alpha,-}$, $i_{\Sigma\beta,-}$ negative phase-sequence system component of a component of a setpoint current space vector
$i_{\Sigma\alpha,+}$, $i_{\Sigma\beta,+}$ positive phase-sequence system component of a component of a setpoint current space vector
S1 to S3 method step
t time
T period
T1 to T4 thyristor
U voltage
$U_{ac}$ AC voltage
$U_{dc}$ DC voltage
$U_n$ voltage at a second phase module branch
$U_p$ voltage at a first phase module branch
$U_s$ voltage at a third phase module branch
$W_{A1}$, $W_{A2}$, $W_{A3}$ energy difference variable
$W_{A\alpha}$, $W_{A\beta}$, $W_{A0}$ component of an energy difference space vector
$W_{\Sigma 1}$, $W_{\Sigma 2}$, $W_{\Sigma 3}$ energy summation variable
$W_{\Sigma\alpha}$, $W_{\Sigma\beta}$, $W_{\Sigma 0}$ component of an energy summation space vector

The invention claimed is:

1. A method of operating a multilevel converter, the method comprising:
providing the multilevel converter with a plurality of phase modules that are connected in parallel with one another between a first DC voltage connection and a second DC voltage connection of the multilevel converter,
each of the phase modules having a plurality of modules each with at least two electronic switching elements and an electrical energy storage device;
each of the phase modules having a first phase module branch, which is connected to the first DC voltage connection, a second phase module branch, which is connected to the second DC voltage connection, a third phase module branch, which connects the first phase module branch with the second phase module branch, and a switching device having a first switching position that connects an AC voltage connection of the phase module to a first connecting point between the first phase module branch and the third phase module branch and a second switching position that connects the AC voltage connection to a second connecting point between the third phase module branch and the second phase module branch;
and the method further comprising:
determining for each of the phase modules an energy summation variable, which is a measure of a sum of the energies of the first phase module branch and the second phase module branch;
determining for each of the phase modules an energy difference variable, which, in the first switching position, is a measure of a difference between the energies of the second phase module branch and the third phase module branch and which, in the second switching position, is a measure of a difference between the energies of the first phase module branch and the third phase module branch, depending on the switching position of the switching device of the respective phase module; and
controlling circulating currents of the multilevel converter in dependence on the energy summation variables and the energy difference variables of the phase modules in order to compensate for energy imbalances between the phase module branches.

2. The method according to claim 1, which comprises forming an energy summation space vector from the energy summation variables of all phase modules and controlling a DC component of the circulating currents depending on the energy summation space vector in order to compensate for the energy imbalances between the phase modules.

3. The method according to claim 2, which comprises determining the energy summation variable of each phase module from a voltage applied to the first phase module branch and a voltage applied to the second phase module branch.

4. The method according to claim 1, which comprises forming an energy difference space vector from the energy difference variables of all phase modules and controlling a positive phase-sequence system and a negative phase-sequence system of the circulating currents depending on the energy difference space vector in order to compensate for the energy imbalances between the phase module branches of the individual phase modules.

5. The method according to claim 4, which comprises:
determining the energy difference variable of each phase module in the first switching position of the switching device of the phase module from a voltage applied to the second phase module branch and a voltage applied to the third phase module branch; and
determining the energy difference variable of each phase module in the second switching position of the switching device of the phase module from a voltage applied to the first phase module branch and the voltage applied to the third phase module branch.

6. The method according to claim 1, wherein the switching device of each phase module in the second switching position disconnects the AC voltage connection of the phase module from the first connecting point and in the first switching position disconnects the AC voltage connection of the phase module from the second connecting point.

7. The method according to claim 1, wherein at least one of the plurality of modules of each third phase module branch is configured for outputting a voltage with a positive or negative polarity.

8. The method according to claim 1, wherein at least one of the plurality of modules of each third phase module branch has a full-bridge circuit.

9. The method according to claim 1, which comprises assuming with the switching device of each phase module the respective switching positions in dependence on an instantaneous value of an AC voltage applied to the AC voltage connection of the respective phase module.

10. The method according to claim 1, which comprises:
assuming with the switching device of each phase module the first switching position when an instantaneous value of the AC voltage applied to the AC voltage connection of the phase module is greater than zero, and assuming with the switching device of each phase module the second switching position when the instantaneous value of the AC voltage applied to the AC voltage connection of the phase module is less than zero; or assuming with the switching device of each phase module the first switching position when the instantaneous value of the AC voltage applied to the AC voltage connection of the phase module lies within a first preselected voltage range, and assuming with the switching device of each phase module the second switching position when the instantaneous value of the AC voltage applied to the AC voltage connection of the phase module lies within a second preselected voltage range.

* * * * *